United States Patent
Nobusawa

[11] Patent Number: 6,088,410
[45] Date of Patent: Jul. 11, 2000

[54] FALSE-SYNCHRONIZATION DETECTION DEVICE FOR BIT-SYNCHRONOUS CIRCUIT OF π/4-SHIFT DQPSK DEMODULATOR

[75] Inventor: Hideaki Nobusawa, Saitama, Japan

[73] Assignee: NEC Corporation, Tokyo, Japan

[21] Appl. No.: 09/081,631

[22] Filed: May 20, 1998

[30] Foreign Application Priority Data

May 23, 1997 [JP] Japan ..................................... 9134102

[51] Int. Cl.⁷ ...................................................... H04L 7/00
[52] U.S. Cl. ........................ 375/354; 375/371; 327/141; 370/503
[58] Field of Search ..................................... 375/354, 355, 375/362, 360, 371, 375, 325, 329, 330, 331, 340, 269, 279, 280, 281, 283; 329/304, 310; 332/103, 104; 327/141, 160, 236, 241; 370/503, 516

[56] References Cited

U.S. PATENT DOCUMENTS 4,653,075  3/1987  Wisniewski .
5,208,839  5/1993  Hladik et al. .

FOREIGN PATENT DOCUMENTS 0 162 505 A1  11/1985  European Pat. Off. .
0 625 837 A2  11/1994  European Pat. Off. .

OTHER PUBLICATIONS

Britsh search report dated Jan. 18, 1999.

Primary Examiner—Chi H. Pham
Assistant Examiner—Jean B. Corrielus
Attorney, Agent, or Firm—McGinn & Gibb, P.C.

[57] ABSTRACT

A false-synchronization detection device comprises an up-down counter which counts down a predetermined amount of clocks when codes of phase changes at former and latter halves of a symbol interval are different, and counts up a different predetermined amount of clocks, which is less than the previous one, when codes of phase changes at former and latter halves of the symbol interval are the same. Thus, the false-synchronization detection device is capable of recognizing false-synchronization of symbol timing when the count value falls as far as the predetermined value.

2 Claims, 7 Drawing Sheets

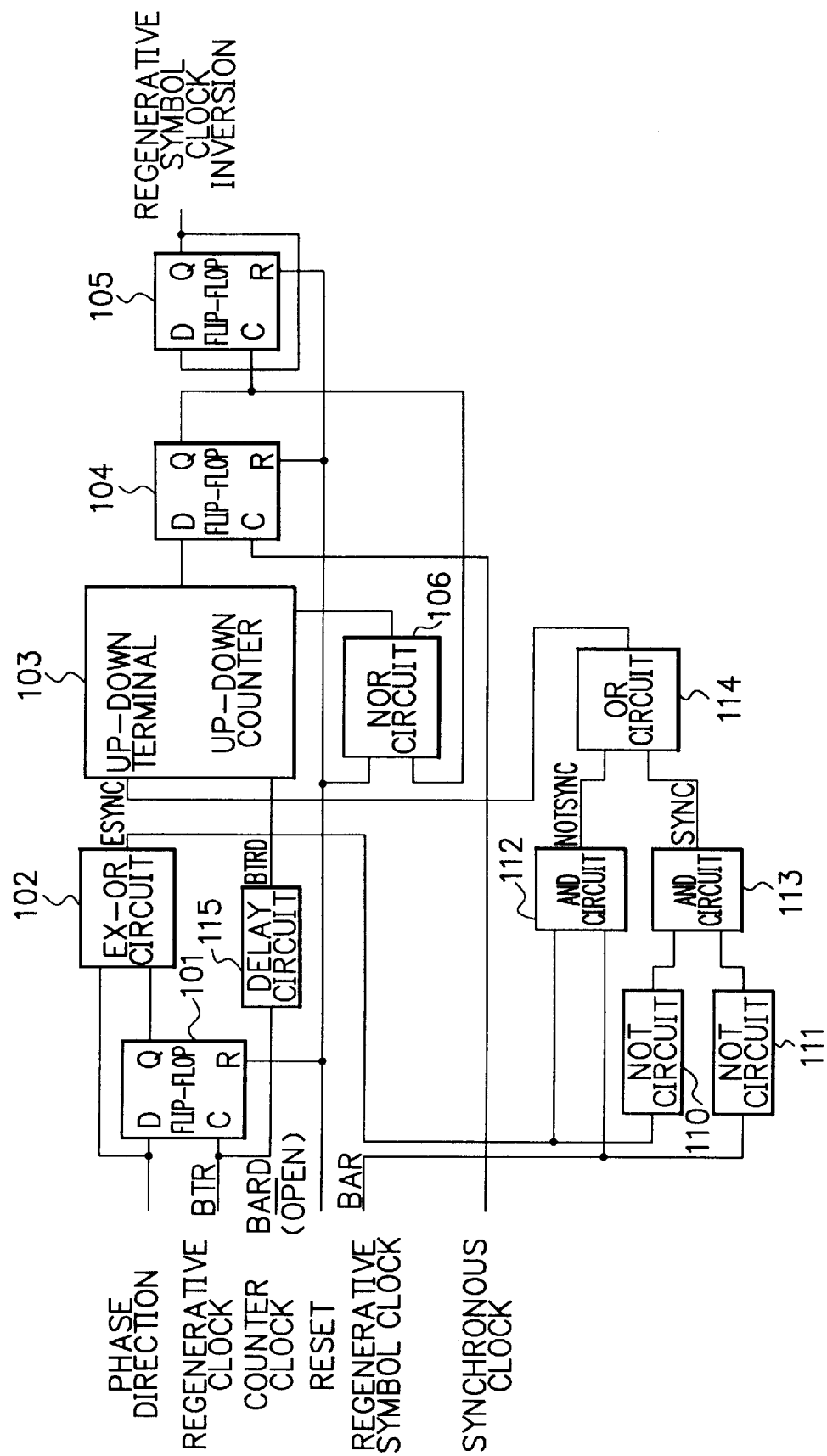

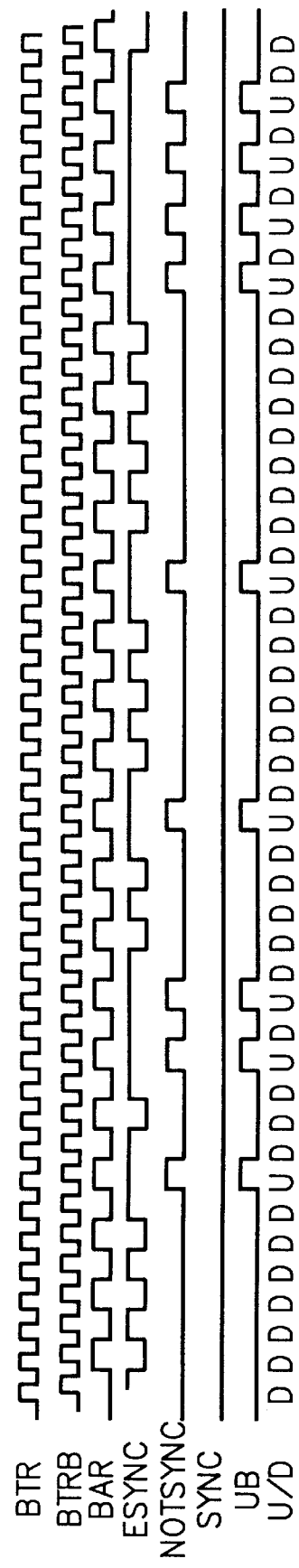

FALSE-SYNCHRONIZATION DETECTION DEVICE FOR BIT-SYNCHRONOUS CIRCUIT OF π/4-SHIFT DQPSK DEMODULATOR

BACKGROUND OF THE INVENTION

The present invention relates to a false-synchronization detection device, particularly to which for a bit-synchronous circuit of a π/4-shift DQPSK (Differential Quaternary Phase Shift Keying) demodulator.

Description of the Related Art

For the purpose of providing a basic technological background with respect to the present invention, the description of a conventional art will be given with reference to FIGS. 1 and 2.

A structure of a conventional false-synchronization detection device which is applied to digital cellular phones etc., is illustrated in FIG. 1. In this particular device, a code comparison with respect to phase changes at former and latter halves of a symbol interval is conducted at a flip-flop 101 and an exclusive-OR (EX-OR) circuit 102 connected to both input and output terminals of the flip-flop 101. An output of the EX-OR circuit 102 is connected to an up-down terminal of a 4-bit up-down counter 103. Further, the up-down counter 103 is to carry out an up-down counting with an application of a signal, which is a regenerative symbol timing clock with a little delay being added, serving as a clock. At this time, when a value reaches zero from a predetermined original value, due to a down-counting, then the false-synchronization detection output is conducted.

In this respect, concerning a data pattern in which phases change in the same direction, a numerical value rises, by which a value does not reach zero even when down-counting happens due to false-synchronization. Further, flip-flops 104 and 105, and an OR circuit 106 are all used in initializing the up-down counter 103.

In this particular false-synchronization detection circuit, phase-change directions with respect to former and latter halves of a symbol interval are detected using a data pattern having phases of an opposite direction. Then when the former half and the latter half are changed in the opposite direction, it is determined that there is a false-synchronization. Moreover, such determination is not possible in a data pattern of a forward direction.

FIG. 2 is a diagram showing signal timing at each circuit constituent shown in FIG. 1. In this diagram, BTR indicates a regenerative clock which is to be inputted to the flip-flop 101, BAR indicates a regenerative symbol clock, BARD indicates a counter clock which is to be inputted to the up-down counter 103, ESYNC indicates an output of the EX-OR circuit 102, and U/D indicates an up-counting mode or a down-counting mode.

With respect to this conventional false-synchronization detection device, however, when there are consecutive forward data patterns in which phases change in the same direction, the phase changes at the former half and the latter half become of the same codes even when the symbol timing is shifted. Thus the count value rises as described, by which count-down-offset is induced, rising difficulties in detecting any false-synchronization.

SUMMARY OF THE INVENTION

It is therefore an object of the present invention to resolve the above-mentioned problems, and to provide a false-synchronization detection device which is capable of detecting false-synchronization in a short period of time, even under such condition where there are consecutive phase changes in the same direction.

According to a first aspect of the present invention, there is provided a false-synchronization detection device, comprising: a programmable counter for generating a timing signal of half a period of a symbol rate, inputting a clock which is even numbered times greater than the symbol rate and an initial count value; a phase measuring circuit for measuring a phase change of a π/4-shift DQPSK signal every half a period of a symbol rate, by inputting the timing signal; a phase change comparing means for comparing phase changes at a former half and a latter half of a symbol interval according to the output from the phase measuring circuit; and a bit-synchronous circuit for increasing and decreasing values of the programmable counter, so as to keep the difference between the phase changes at the former half and the latter half of the symbol interval to the smallest value possible; the up-down counter counting down a predetermined amount of clocks when a code of phase change at a former half and a code of phase change at a latter half of the symbol interval do not coincide with each other, the up-down counter counting up a predetermined amount of clocks, which is less than the previous predetermined value, when a code of phase change at a former half and a code of phase change at a latter half of the symbol interval coincide with each other, thus recognizing a symbol timing false-synchronization when a count value is brought down to a predetermined value.

According to a second aspect of the present invention, there is provided a false-synchronization detection device, comprising: a programmable counter for generating a timing signal of half a period of a symbol rate, inputting a clock which is even numbered times greater than the symbol rate and an initial count value; a phase measuring circuit for measuring a phase change of a π/4-shift DQPSK signal every half a period of a symbol rate, by inputting the timing signal; a phase change comparing means for comparing phase changes at a former half and a latter half of a symbol interval according to the output from the phase measuring circuit; and a bit-synchronous circuit for increasing and decreasing values of the programmable counter, so as to keep the difference between the phase changes at the former half and the latter half of the symbol interval to the smallest value possible; the up-down counter counting down the clocks when a code of phase change at a former half and a code of phase change at a latter half of the symbol interval do not coincide with each other, the up-down counter counting up the clocks when a code of phase change at a former half and a code of phase change at a latter half of the symbol interval coincide with each other, the up-down counter counting up the clocks when a code of phase change at a latter half of the symbol interval, one before the present, and a code of phase change at a former half of the present symbol interval do not coincide with each other, thus recognizing a symbol timing false-synchronization when a count value is brought down to a predetermined value.

The above and further objects and the novel feature of the invention will more fully appear from the following detailed description when the same is read in connection with the accompanying drawings. It is to be expressly understood, however, that the drawings are for illustration only and are not intended as a definition of the limits of the invention.

BRIEF DESCRIPTION OF THE DRAWINGS

FIG. 6 is a block diagram showing a false-synchronization detection device of a second embodiment of the present invention; and FIG. 7 is a timing chart showing signals of each of circuit constituents shown in FIG. 6.

DESCRIPTION OF THE PREFERRED EMBODIMENTS

Figure 1:
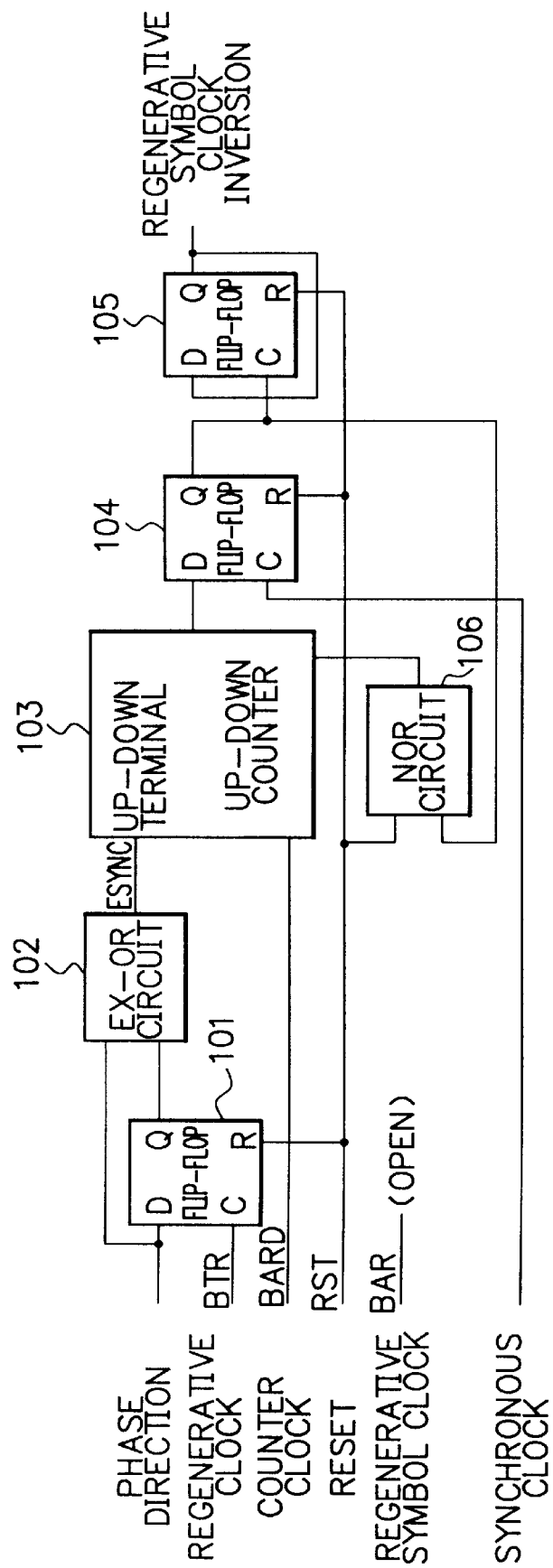
FIG. 1 is a block diagram showing a conventional false-synchronization detection device.
Figure 2:
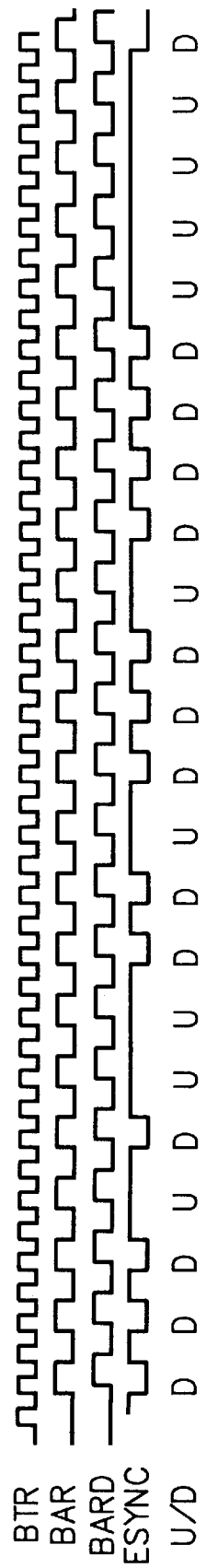
FIG. 2 is a timing chart showing signals of each of circuit constituents shown in FIG. 1.

Referring now to the drawings, a description of preferred embodiments of the present invention will be described in detail.

Figure 3:
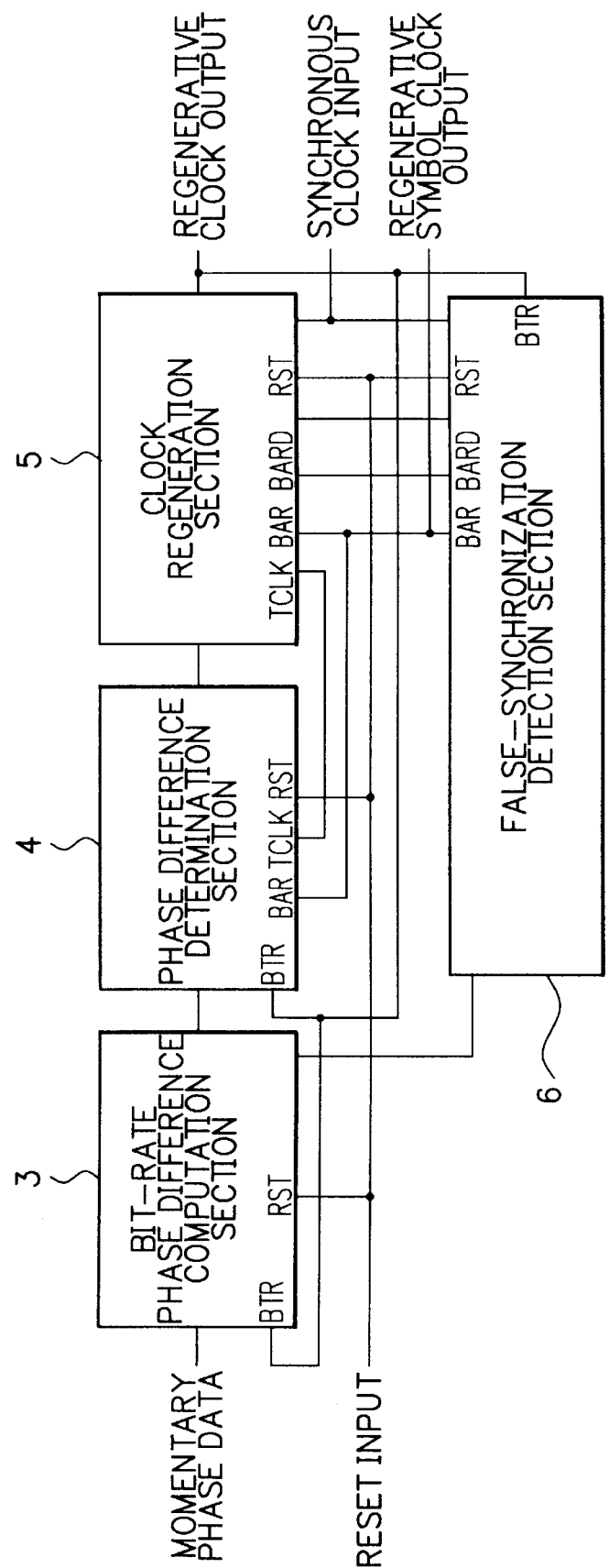
FIG. 3 is a block diagram showing a bit-synchronous circuit including a false-synchronization detection device of a first embodiment of the present invention.

FIG. 3 shows a bit-synchronous circuit for clock regeneration of a delay detection circuit for use in demodulation of a π/4-shift DQPSK modulation wave, with respect to a digital cellular phone. In this figure, a reference numeral 3 indicates a bit-rate phase difference computation section serving as a phase measuring circuit. A clock regeneration section 5 inputs clocks greater than the symbol rate by even numbered times, and an initial count value, so as to input a regenerative clock (to be referred to as a bit-rate clock) of half a period of the symbol rate, which divides and outputs the synchronous clock. Thus, phase change of the π/4-shift DQPSK signal is measured at half a period of the symbol rate. A reference numeral 4 indicates a phase difference determination section, serving as a phase change comparing means. This phase difference determination section is to correct the counter value of the clock regeneration section 5, which serves as a programmable counter, in order to keep a difference between phase changes of the former and latter halves of the symbol interval to a minimum, thus obtaining a regenerative symbol clock. A reference numeral 6 denotes a false-synchronization detection section.

Regarding this sort of a bit-synchronous circuit, when the regenerative symbol clock is shifted by exactly half a period, the difference between phase changes at the former half and the latter half should appear as positive codes and negative codes in the same rate. Consequently, a phase correction direction is oscillated on the spot, and does not coincide with the symbol timing for a long time. Originally, the phase change at the former half and that at the latter half are of the same codes. However, when the symbol clock is shifted by half a period, different codes will be included. The false-synchronization detection section 6 is monitoring such occasions where different codes are recognized, so it can inverse and output the symbol clock in proper timing.

Figure 4:
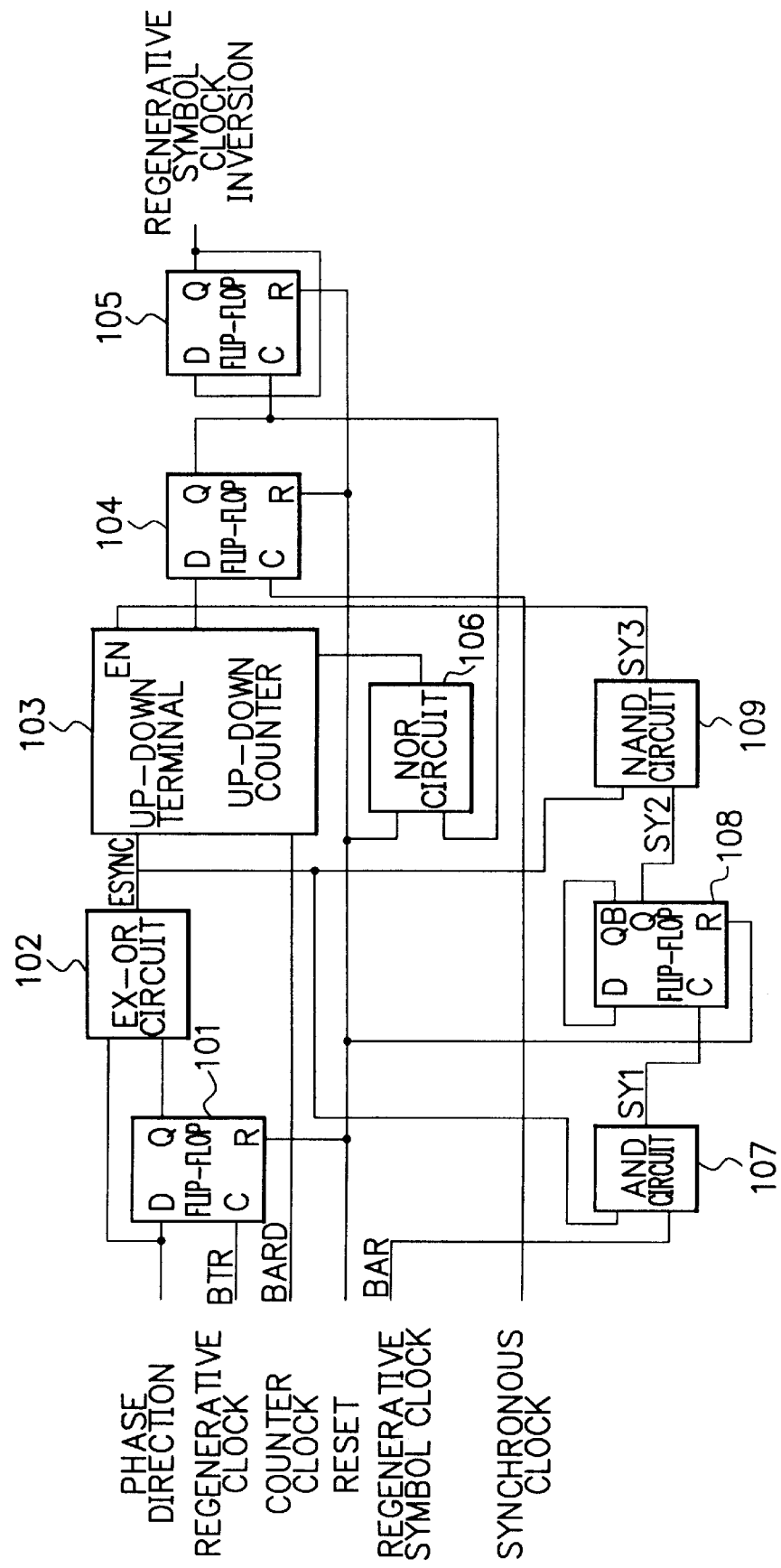
FIG. 4 is a block diagram showing a false-synchronization detection device shown in FIG. 3.
Figure 5:
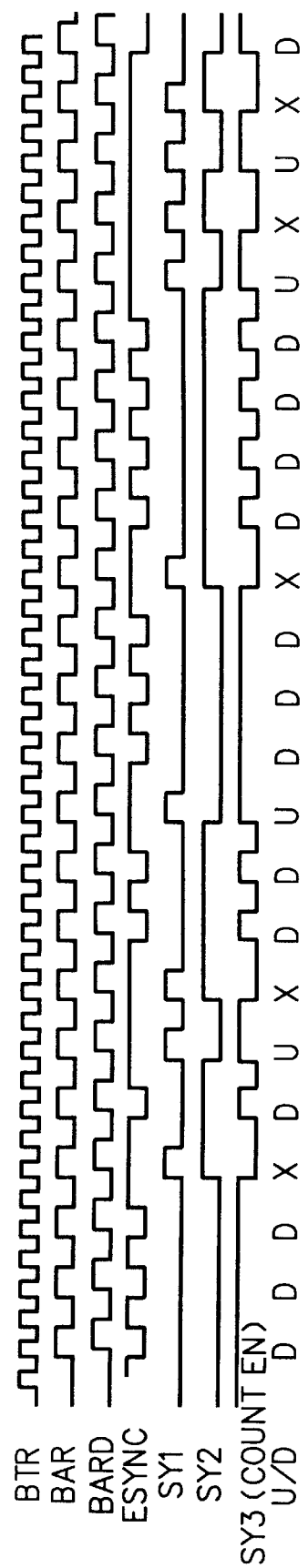
FIG. 5 is a timing chart showing signals of each of circuit constituents shown in FIG. 4.

FIG. 4 is a diagram showing details of the false-synchronization circuit 6. The basic structure of the circuit shown in FIG. 4 is the same as the one shown in FIG. 1, although it is further provided with an AND circuit 107, a flip-flop 108, and a NAND circuit 109. The AND circuit 107 takes an output of the EX-OR circuit 102 and a regenerative symbol clock as its inputs. The flip-flop 108 takes an output of the AND circuit 107 as its input. According to this circuit, a phase change direction signal (ESYNC) in the neighboring period at half a period of a symbol rate is outputted from the EX-OR circuit 102, the EX-OR circuit 102 being connected to the input and output terminals of the flip-flop 101. This phase change direction signal becomes "H" when a comparison of phase changes at the former and latter halves are of the same codes. On the other hand, when a comparison of phase changes at the former and latter halves are of different codes, then they become "L". According to such comparison results, the phase change direction signal is transmitted to the up-down terminal of the up-down counter 103, where its value is updated at a rise of a counter clock (BARD) which is a regenerative symbol clock (BAR) with a little delay being added. FIG. 5 shows an example in which a regenerative symbol clock is shifted by half a period.

The phase change direction signal shows a result of comparing phase changes at the former and latter halves of the regenerative symbol clock interval, at a rise of the regenerative symbol clock. On the other hand, the signal shows a result of comparing phase changes at the latter half of the symbol interval, one before the present, and the former half of the present symbol interval, at a fall of the regenerative symbol clock. Consequently, although the phase change direction signal is always "H" following a synchronization establishment, now that the signal is shifted by half a period, there is a situation in which the phase change direction signal is "L" at a rise of the regenerative symbol clock.

Under this particular condition, an interval where the phase change direction signal is "H", in spite of half a period shift, is a consequence of consecutive phase changes in the same direction. When the phase change direction signal is "H" at the former half of the symbol interval, there will be a "H" pulse outputted toward the output side of the AND circuit 107. Therefore, an output Q of the flip-flop 108 will be inverted at every single "H" pulse from the AND circuit 107's output side SY1. Further, the NAND circuit 109 will output a phase change direction signal "L", every other time when the phase change direction signal becomes "H", so as to temporally stop the up-down counter 103.

FIG. 6 shows another embodiment of the present invention. The example presented here, as it is clear from FIG. 7 showing signal timing, is a case where a regenerative symbol clock is shifted by half a period. In FIG. 6, the phase change direction signal and the regenerative symbol clock from the EX-OR circuit 102 are directly inputted to an AND circuit 112, and at the same time inputted to an AND circuit 103 via NOT circuits 110 and 111. Then the output from AND circuits 112 and 113 are sent to the up-down terminal of the up-down counter 103 through an OR circuit 114.

According to this particular embodiment, an output of the OR circuit 114 becomes "H" when the phase changes at the former and latter halves of the symbol interval are of the same codes. The output also becomes "H" when the phase change at the latter half of the symbol interval, one before the present, and the phase change at the present symbol interval are of different codes. On the other hand, the output of the OR circuit 114 becomes "L" when the phase changes at the former and latter halves of the symbol interval are of different codes. The output also becomes "L" when the phase change at the latter half of the symbol interval, one before the present, and the phase change at the present symbol interval are of the same codes.

In this case, parts corresponding to a phase change at the latter half of the symbol interval, one before the present, and to a phase change at the present symbol interval are originally former and latter halves where synchronization is taken off, by which they always become the same codes. Therefore, the output of the OR circuit 114 is always of a "L" level.

Meanwhile, a clock which is a regenerative clock (a bit-rate clock) having been a little delayed at a delay circuit 115, is inputted to the up-down counter 103, so as to let the counter operate an up-down counting. Owing to this, the comparison of phase changes at the former and latter halves of the symbol interval, and the comparison of a phase change at the latter half of a symbol interval, one before the present, and a phase change at the present symbol interval are both reflected. Therefore, by cancelling out false rise of numerical values caused by a data pattern in which phases change in the same direction, it is possible to swiftly bring the value to become zero by false-synchronization. The following process for outputting a false-synchronization signal is the same as is explained with reference to FIG. 4.

In conclusion, according to the present invention, by the application of the up-down counter; ① clocks are counted down by a predetermined amount, when the codes of phase changes at the former and latter halves of the symbol interval are different, ② a different predetermined amount which is less than the previous one is counted up when codes of phase changes at the former and latter halves of the symbol interval are the same, ③ counting down when codes of phase changes at the former and latter halves of the symbol interval are different, ④ counting up when codes of phase changes at the former and latter halves of the symbol interval are the same, and ⑤ counting up when a code of the latter half of the symbol interval, one before the present, and a code of the former half of the present interval are different. Owing to such a structure, when a value of the up-down counter falls as far as a predetermined value, it becomes possible to recognize it as a symbol timing false-synchronization. Further, even when there are adjoining symbols which are changing in the same direction, it is possible to control the rising of a count value of the up-down counter, by which a faster detection of false-synchronization is made available.

While preferred embodiments of the invention have been described using specific terms, such description is for illustrative purposes only, and it is to be understood that changes and variations may be made without departing from the spirit or the scope of the following claims.

What is claimed is:

1. A false-synchronization detection device, comprising:

a programmable counter for generating a timing signal of half a period of a symbol rate, inputting a clock which is even numbered times greater than the symbol rate and an initial count value;

a phase measuring circuit for measuring a phase change of a π/4-shift DQPSK signal every half a period of a symbol rate, by inputting the timing signal;

a phase change comparing means for comparing phase changes at a former half and a latter half of a symbol interval according to the output from the phase measuring circuit; and a bit-synchronous circuit for increasing and decreasing values of the programmable counter, so as to keep the difference between the phase changes at the former half and the latter half of the symbol interval to the smallest value possible;

the programmable counter counting down first a predetermined amount of clocks when a code of phase change at a former half and a code of phase change at a latter half of the symbol interval do not coincide with each other, the programmable counter counting up second a predetermined amount of clocks, which is less than the first predetermined amount, when a code of phase change at a former half and a code of phase change at a latter half of the symbol interval coincide with each other, thus recognizing a symbol timing false-synchronization when a count value is brought down to a predetermined value.

2. A false-synchronization detection device, comprising:

a programmable counter for generating a timing signal of half a period of a symbol rate, inputting a clock which is even numbered times greater than the symbol rate and an initial count value;

a phase measuring circuit for measuring a phase change of a π/4-shift DQPSK signal every half a period of a symbol rate, by inputting the timing signal;

a phase change comparing means for comparing phase changes at a former half and a latter half of a symbol interval according to the output from the phase measuring circuit; and a bit-synchronous circuit for increasing and decreasing values of the programmable counter, so as to keep the difference between the phase changes at the former half and the latter half of the symbol interval to the smallest value possible;

the programmable counter counting down the clocks when a code of phase change at a former half and a code of phase change at a latter half of the symbol interval do not coincide with each other, the programmable counter counting up the clocks when a code of phase change at a former half and a code of phase change at a latter half of the symbol interval coincide with each other, the programmable counter counting up the clocks when a code of phase change at a latter half of the symbol interval, one before the present, and a code of phase change at a former half of the present symbol interval do not coincide with each other, thus recognizing a symbol timing false-synchronization when a count value is brought down to a predetermined value.

* * * * *